US012602501B2

(12) United States Patent
Kurian et al.

(10) Patent No.: US 12,602,501 B2
(45) Date of Patent: Apr. 14, 2026

(54) SYSTEM AND METHOD FOR GENERATING SYNTHETIC DATA

(71) Applicant: Bank of America Corporation, Charlotte, NC (US)

(72) Inventors: Manu Kurian, Dallas, TX (US); Michael R. Young, Davidson, NC (US); Vinesh Premji Patel, Greenwich (GB)

(73) Assignee: Bank of America Corporation, Charlotte, NC (US)

( * ) Notice: Subject to any disclaimer, the term of this patent is extended or adjusted under 35 U.S.C. 154(b) by 1 day.

(21) Appl. No.: 18/788,040

(22) Filed: Jul. 29, 2024

(65) Prior Publication Data

US 2026/0030377 A1     Jan. 29, 2026

(51) Int. Cl.
*G06F 21/62* (2013.01)
*G06F 21/53* (2013.01)

(52) U.S. Cl.
CPC .......... *G06F 21/6218* (2013.01); *G06F 21/53* (2013.01); *G06F 2221/034* (2013.01)

(58) Field of Classification Search
CPC . G06F 21/6218; G06F 21/53; G06F 2221/034
See application file for complete search history.

(56) References Cited

U.S. PATENT DOCUMENTS

| | | | |
|---|---|---|---|
| 7,996,892 | B2 | 8/2011 | Pomerantz |
| 8,498,418 | B2 | 7/2013 | Meissner et al. |
| 9,111,123 | B2 | 8/2015 | Mansi et al. |
| 9,213,867 | B2 | 12/2015 | Ramamurthy et al. |
| 9,342,705 | B1 | 5/2016 | Schneider et al. |
| 10,050,982 | B1 | 8/2018 | Guerra et al. |
| 10,157,290 | B1 | 12/2018 | Sinha et al. |
| 10,169,600 | B2 | 1/2019 | Feng et al. |
| 10,547,596 | B2 | 1/2020 | Boivie et al. |
| 10,831,912 | B2 | 11/2020 | Karn |
| 10,877,927 | B2 | 12/2020 | Zargahi et al. |
| 10,904,226 | B2 | 1/2021 | Boivie et al. |
| 10,917,394 | B2 | 2/2021 | Manu et al. |
| 11,178,171 | B2 | 11/2021 | Hsiung et al. |
| 11,216,565 | B1 | 1/2022 | Silva et al. |
| 11,263,256 | B2 | 3/2022 | Zargahi |
| 11,809,909 | B2 | 11/2023 | Zargahi et al. |
| 11,947,692 | B1 | 4/2024 | Sanchez Rola et al. |
| 2018/0309569 | A1 | 10/2018 | Martin et al. |
| 2022/0166795 | A1* | 5/2022 | Simioni ............... G06F 21/552 |
| 2023/0244798 | A1 | 8/2023 | Williams et al. |

OTHER PUBLICATIONS

Manu Kurian, A system and method for generating real-time obfuscated data, U.S. Appl. No. 18/788,024, filed Jul. 29, 2024, p. 1-49.

* cited by examiner

*Primary Examiner* — Beemnet W Dada

(57)     ABSTRACT

In response to receiving a request to generate synthetic data based on real-world data that is stored in a first memory, a processor accesses the first memory to extract at least a portion of the real-world data to use as sample data and determines data properties of the real-world data based on the sample data. The processor generates, based on the data properties, the requested synthetic data that at least partially mimics the real-world data. In response to detecting a request from an unauthorized user to access the real-world data, the processor provides the unauthorized user access to the synthetic data that mimics the real-world data.

17 Claims, 5 Drawing Sheets

400 —

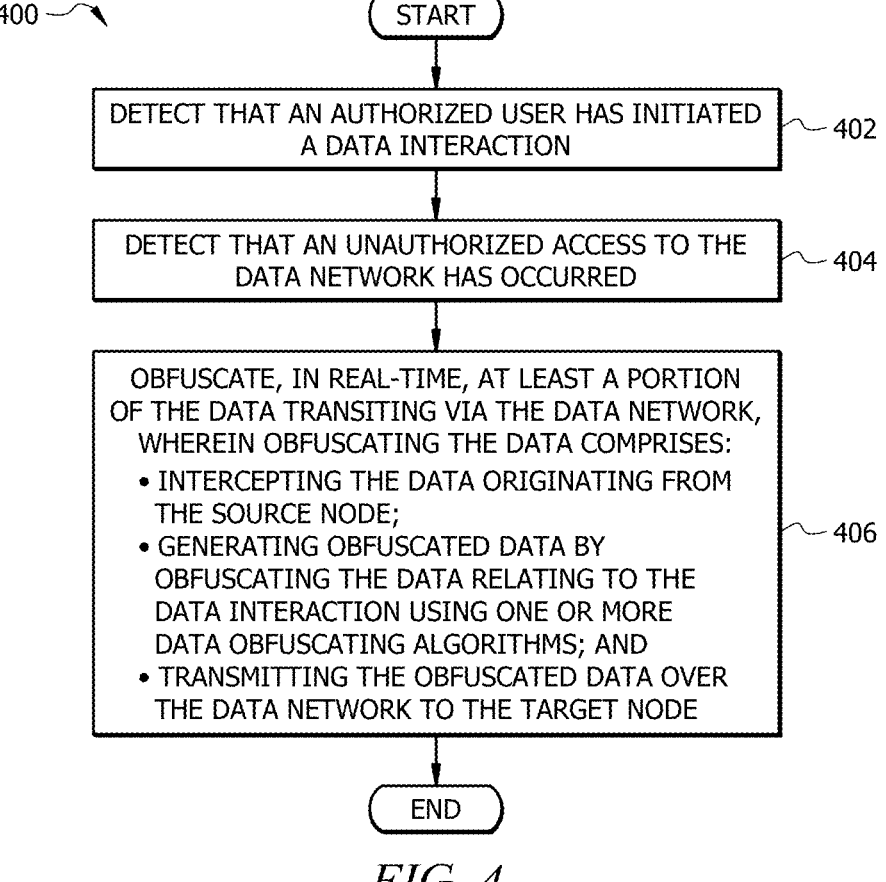

START

DETECT THAT AN AUTHORIZED USER HAS INITIATED
A DATA INTERACTION — 402

DETECT THAT AN UNAUTHORIZED ACCESS TO THE
DATA NETWORK HAS OCCURRED — 404

OBFUSCATE, IN REAL-TIME, AT LEAST A PORTION
OF THE DATA TRANSITING VIA THE DATA NETWORK,
WHEREIN OBFUSCATING THE DATA COMPRISES:
- INTERCEPTING THE DATA ORIGINATING FROM
  THE SOURCE NODE;
- GENERATING OBFUSCATED DATA BY
  OBFUSCATING THE DATA RELATING TO THE
  DATA INTERACTION USING ONE OR MORE
  DATA OBFUSCATING ALGORITHMS; AND
- TRANSMITTING THE OBFUSCATED DATA OVER
  THE DATA NETWORK TO THE TARGET NODE

— 406

END

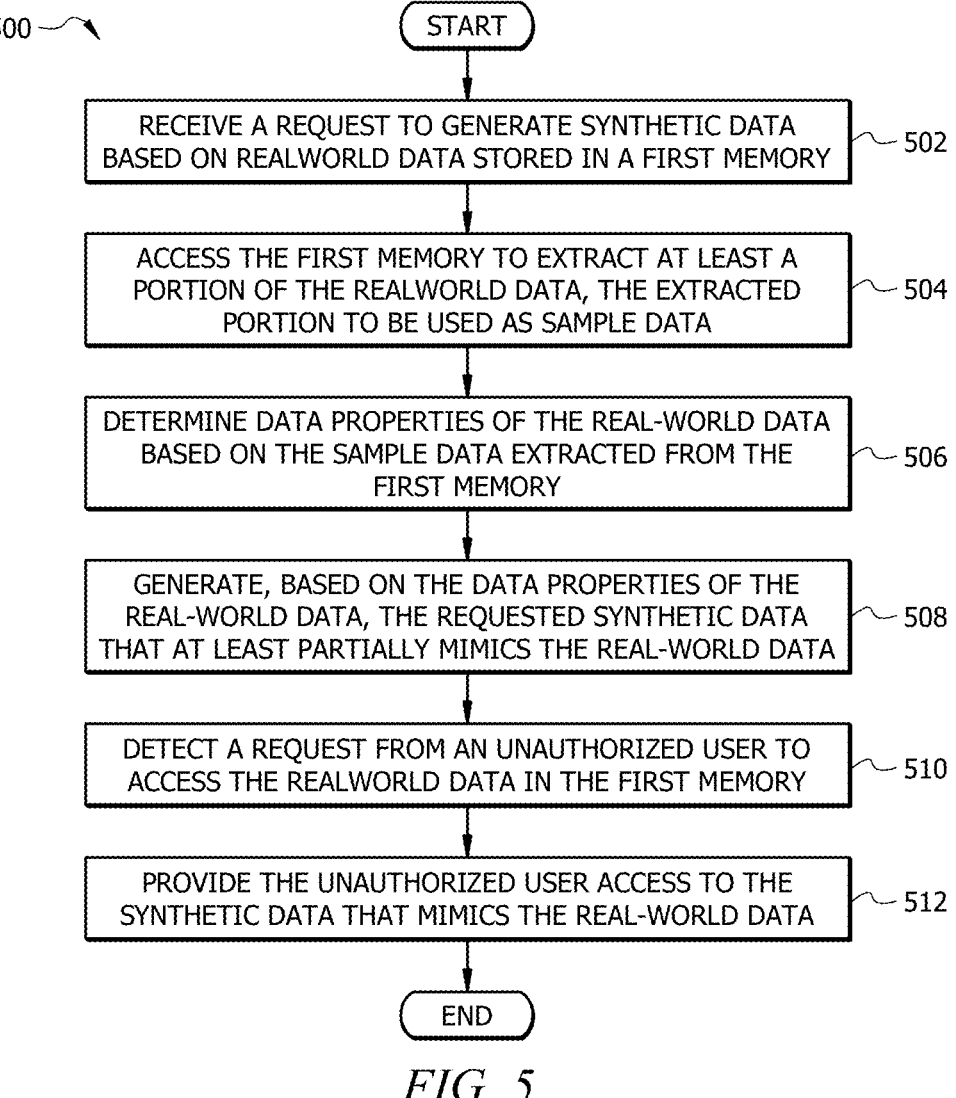

START

RECEIVE A REQUEST TO GENERATE SYNTHETIC DATA BASED ON REALWORLD DATA STORED IN A FIRST MEMORY ⟿ 502

ACCESS THE FIRST MEMORY TO EXTRACT AT LEAST A PORTION OF THE REALWORLD DATA, THE EXTRACTED PORTION TO BE USED AS SAMPLE DATA ⟿ 504

DETERMINE DATA PROPERTIES OF THE REAL-WORLD DATA BASED ON THE SAMPLE DATA EXTRACTED FROM THE FIRST MEMORY ⟿ 506

GENERATE, BASED ON THE DATA PROPERTIES OF THE REAL-WORLD DATA, THE REQUESTED SYNTHETIC DATA THAT AT LEAST PARTIALLY MIMICS THE REAL-WORLD DATA ⟿ 508

DETECT A REQUEST FROM AN UNAUTHORIZED USER TO ACCESS THE REALWORLD DATA IN THE FIRST MEMORY ⟿ 510

PROVIDE THE UNAUTHORIZED USER ACCESS TO THE SYNTHETIC DATA THAT MIMICS THE REAL-WORLD DATA ⟿ 512

END

*FIG. 5*

SYSTEM AND METHOD FOR GENERATING SYNTHETIC DATA

TECHNICAL FIELD

The present disclosure relates generally to network communication, and more specifically to a system and method for generating synthetic data.

BACKGROUND

Often, systems that store, process, and/or handle sensitive data in some manner are prone to cyber-attacks that may lead to data theft. Bad actors use several techniques to identify and steal sensitive data. For example, a bad actor may hack into a database and steal sensitive data stored in the database. In another example, a bad actor may gain access to a data network and steal sensitive data transiting the network. In another example, a bad actor may monitor data interactions being performed by a user and follow the path taken by the data interaction within a computing infrastructure to identify databases and servers that store sensitive data and then steal data from those identified databases and servers. Present systems are not equipped to effectively avoid and/or prevent theft of sensitive data.

SUMMARY

The system and method implemented by the system as disclosed in the present disclosure provide technical solutions to the technical problems discussed above by avoiding theft of sensitive data (e.g., as a result of cyber-attacks) in a computing network.

For example, the disclosed system and methods provide the practical application of obfuscating real-world data to protect sensitive information. A security manager identifies sensitive data associated with a data interaction performed in the computing infrastructure and obfuscates at least a portion of the identified data to avoid a bad actor from stealing data. For example, in response to detecting that an authorized user has initiated a data interaction, the security manager may start monitoring the network for unauthorized access (e.g., cyber-attacks). In response to detecting that a network link between a source node and a target node has been compromised, the security manager intercepts real-world data originating from the source node and obfuscates at least a portion of the real-world data using one or more data obfuscation algorithms to generate obfuscated data. The obfuscated data is then injected back into the network on to the network link for transmission to the target node. Thus, the unauthorized user who has unauthorized access to the network can only access the obfuscated data that does not include any useful information (e.g., sensitive data). The security manager performs the entire process starting from intercepting real-world data transmitted by the source node to injecting the obfuscated data back into the network in real-time or near real-time. Performing these operations in real-time or near real-time allows the security manager to minimize delays in transmission of data between the source node and the target node. By reducing data transmission delays in the network, the disclosed system and methods improve network efficiency of the network.

The disclosed system and methods provide an additional practical application of identifying portions of a data transmission that include sensitive data and obfuscating only the identified portions of the data. As described in embodiments of the present disclosure, the security manager may be configured to identify one or more portions of the real-world data that include sensitive data. Once one or more portions of the real-world data are identified as including sensitive data, the security manager may be configured to obfuscate only those identified portions while leaving the remaining portion of the real-world data un-obfuscated. By identifying portions of the real-world data that include sensitive data and obfuscating only the identified portions, the disclosed system and methods save processing resources that would otherwise be used to obfuscate the entire real-world data. Saving processing resources improves processing efficiency of a computing node that implements the security manager as the real-world data may be processed faster. Further, faster obfuscation of the real-world data causes reduced network delays as the obfuscated data may be injected back into the network faster. The reduced network delay improves network efficiency of the network.

The disclosed system and methods provide an additional practical application of applying different degrees of obfuscation to different portions of the real-world data. As described in embodiments of the present disclosure, the security manager may be configured to identify and assign different obfuscating levels to different portions of the real-world data depending on the data sensitivity levels associated with the respective portions of the real-world data. The security manager then obfuscates each portion of the real-world data using one or more data obfuscating algorithms associated with the obfuscating level assigned to the portion of data. By identifying different obfuscating levels for different portions of the real-world data and obfuscating the different portions by different degrees, the disclosed system and methods save processing resources that would otherwise be used to obfuscate the entire real-world data at a higher obfuscating level. Saving processing resources improves processing efficiency of a computing node that implements the security manager as the real-world data may be processed faster. Further, faster obfuscation of the real-world data causes reduced network delays as the obfuscated data may be injected back into the network faster. The reduced network delay improves network efficiency of the network.

The disclosed system and methods provide an additional practical application of generating synthetic data that at least partially mimics real-world data and diverting an unauthorized access of the real-world data to the synthetic data. As described in embodiments of the present disclosure the security manager proactively generates synthetic data that mimics real-world data associated with (e.g., stored in) a real-world system. For example, in response to receiving a request to generate the synthetic data that mimics the real-world data, the security manager accesses the real-world system (e.g., a memory device that stores the real-world data) and extracts at least a portion of the real-world data for use as sample data when generating the synthetic data. Once the sample data has been obtained from the real-world system, the security manager determines data properties of the real-world data based on the sample data. The security manager then generates synthetic data that satisfies the data properties of the real-world data. In other words, the security manager generates synthetic data whose data properties at least partially match with the data properties of the real-world data, which causes the synthetic data to at least partially mimic the real-world data. Once the synthetic data has been generated, the security manager may divert unauthorized accesses of the real-world data to the synthetic data to avoid a bad actor from gaining access to the real-world data that may include sensitive information. For example, in response to detecting that an unauthorized user is attempting to access the real-world data (e.g., in response to detecting an unauthorized request), the security manager provides the unauthorized user access to the synthetic data that mimics the real-world data, instead of providing access to the real-world data. This avoids a bad actor from gaining access to the real-world data that may include sensitive information. Further, since the synthetic data mimics the of the real-world data, the bad actor may not distinguish the synthetic data from the real-world data and may not discover that the bad actor has accessed the synthetic data instead of the real-world data. This essentially may distract and/or mislead the unauthorized user and may avoid theft of the real-world data or a portion thereof. By diverting an unauthorized access of the real-world data to the synthetic data, the disclosed system and method avoid theft of sensitive data and thus improve data security in a computing network.

The disclosed system and method provide an additional practical application of avoiding unauthorized access of a real-world system by diverting unauthorized accesses to a synthetic system that is physically different from the real-world system. As described in embodiments of the present disclosure the security manager may store the synthetic data in a synthetic system that is different from the real-world system. When an unauthorized access to the real-world system (e.g., by an unauthorized user) is detected, the security manager may provide the unauthorized user access to the synthetic system instead of the real-world system. By diverting the unauthorized access to a different system, the security manager may provide physical and/or logical separation between the real-world system and the synthetic system and thus avoid the unauthorized user from gaining access to the real-world system or any portion thereof. This improves data security of the real-world system. Additionally, by detecting and diverting unauthorized accesses of the real-world system to the synthetic system, the disclosed system and method avoid unnecessary processing of unauthorized requests at the real-world system. This reduces processing load at the real-world system thus improving processing efficiency of the real-world system.

Thus, the disclosed system and method generally improve the technology associated with data security of computing networks.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4 illustrates a flowchart of an example method for obfuscating data, in accordance with one or more embodiments of the present disclosure; and FIG. 5 illustrates a flowchart of an example method for protecting sensitive information, in accordance with one or more embodiments of the present disclosure.

DETAILED DESCRIPTION

Figure 1:
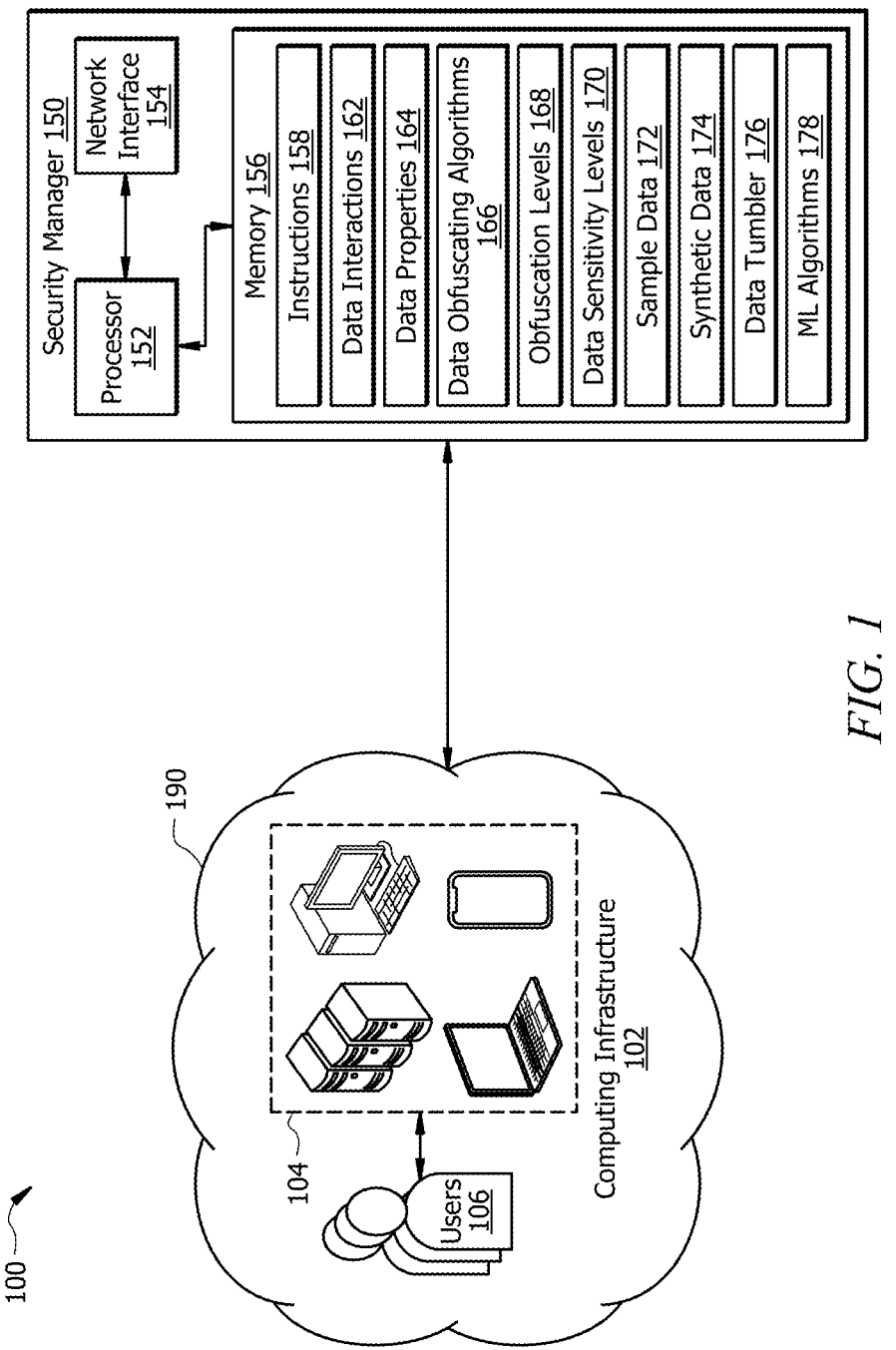
FIG. 1 is a schematic diagram of a system, in accordance with certain aspects of the present disclosure.

FIG. 1 is a schematic diagram of a system 100, in accordance with certain aspects of the present disclosure. As shown, system 100 includes a computing infrastructure 102 connected to a network 190. Computing infrastructure 102 may include a plurality of hardware and software components. The hardware components may include, but are not limited to, computing nodes 104 such as desktop computers, smartphones, tablet computers, laptop computers, servers and data centers, mainframe computers, virtual reality (VR) headsets, augmented reality (AR) glasses and other hardware devices such as printers, routers, hubs, switches, and memory all connected to the network 190. Software components may include software applications that are run by one or more of the computing nodes 104 including, but not limited to, operating systems, user interface applications, third party software, database management software, service management software, mainframe software, metaverse software, AI tools and other customized software programs (e.g., security manager 150) implementing particular functionalities. For example, software code relating to one or more software applications may be stored in a memory device and one or more processors (e.g., belonging to one or more computing nodes 104) may execute the software code to implement respective functionalities. An example software application run by one or more computing nodes 104 of the computing infrastructure 102 may include the security manager 150. In one embodiment, at least a portion of the computing infrastructure 102 may be representative of an Information Technology (IT) infrastructure of an organization.

One or more of the computing nodes 104 may be operated by a user 106. In this context, a computing node 104 operated by a user may be referred to as a user device. For example, a computing node 104 may provide a user interface using which a user 106 may operate the computing node 104 to perform data interactions within the computing infrastructure 102. The term "computing node 104" may be replaced by "user device" in this disclosure when the computing node 104 is operated by a user 106.

One or more computing nodes 104 of the computing infrastructure 102 may be representative of a computing system which hosts software applications that may be installed and run locally or may be used to access software applications running on a server. The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices. In certain embodiments, one or more of the computing nodes 104 may be representative of a server running one or more software applications to implement respective functionality as described below. In certain embodiments, one or more of the computing nodes 104 may run a thin client software application where the processing is directed by the thin client but largely performed by a central entity such as a server (not shown).

Network 190, in general, may be a wide area network (WAN), a personal area network (PAN), a cellular network, or any other technology that allows devices to communicate electronically with other devices. In one or more embodiments, network 190 may be the Internet.

As described above, a user 106 may operate a computing node 104 (e.g., a personal computer) to perform a data interaction within the computing infrastructure 102. For example, a user 106 may operate a user device (e.g., one of the computing nodes 104) to perform a particular data interaction within the computing infrastructure 102. Data interactions that may be performed in the computing infrastructure 102 may include accessing data stored in a memory device (e.g., database or server) of the computing infrastructure 102, processing data by a processing server of the computing infrastructure 102, transmission of data between computing nodes 104 of the computing infrastructure 102, or a combination thereof. In one example, a data interaction may include a user 106 requesting a piece of data stored on a database or server (e.g., a computing node 104) of the computing infrastructure 102 and receiving the requested data at a user device (e.g., another computing node 104). For example, the user 106 may use a webmail application running on the user device to request and receive email data from an email server. In another example, a data interaction requested by a user 106 using a user device may include data transmission from a first computing node 104 to a second computing node 104 of the computing infrastructure. For example, sending an email by a first user to a second user may include transmission of email data from a first email server associated with the first user to a second email server associated with the second user. Performing a data interaction within the computing infrastructure 102 may include accessing, processing, and or transmission of sensitive data including, but not limited to, Non-Public Information (NPI), Personal Identification Information (PII), Production Information, or any other data that is designated as sensitive data.

Often systems that store, process, or handle sensitive data in some manner are prone to cyber-attacks that may lead to data theft. Bad actors use several techniques to identify and steal sensitive data. For example, a bad actor may hack into a database and steal sensitive data stored in the database. In another example, a bad actor may gain access to a data network (e.g., network 190) and steal sensitive data transiting the network. In another example, a bad actor may monitor data interactions being performed by a user and follow the path taken by the data interaction within the computing infrastructure 102 to identify databases and servers that store sensitive data and then steal data from those identified sources. Present systems are not equipped to effectively avoid and/or prevent theft of sensitive data.

Embodiments of the present disclosure describe techniques to avoid theft of sensitive data (e.g., as a result of cyber-attacks) in a computing network (e.g., computing infrastructure 102).

At least a portion of the computing infrastructure 102 (e.g., one or more computing nodes 104) may implement a security manager 150 which may be configured to implement techniques for avoiding data theft in a computing network (e.g., computing infrastructure 102). The security manager 150 includes a processor 152, a memory 156, and a network interface 154. The security manager 150 may be configured as shown in FIG. 1 or in any other suitable configuration.

The processor 152 includes one or more processors operably coupled to the memory 156. The processor 152 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 152 may be a programmable logic device, a microcontroller, a microprocessor, or any suitable combination of the preceding. The processor 152 is communicatively coupled to and in signal communication with the memory 156. The one or more processors are configured to process data and may be implemented in hardware or software. For example, the processor 152 may be 8-bit, 16-bit, 32-bit, 64-bit or of any other suitable architecture. The processor 152 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions, such as software instructions. For example, the one or more processors are configured to execute instructions 158 to implement the security manager 150. In this way, processor 152 may be a special-purpose computer designed to implement the functions disclosed herein. In one or more embodiments, the security manager 150 is implemented using logic units, FPGAs, ASICs, DSPs, or any other suitable hardware. The security manager 150 is configured to operate as described with reference to FIGS. 4 and 5. For example, the processor 152 may be configured to perform at least a portion of methods 400 and 500 as described with reference to FIGS. 4 and 5, respectively.

The memory 156 includes a non-transitory computer-readable medium such as one or more disks, tape drives, or solid-state drives, and may be used as an over-flow data storage device, to store programs when such programs are selected for execution, and to store instructions and data that are read during program execution. The memory 156 may be volatile or non-volatile and may include a read-only memory (ROM), random-access memory (RAM), ternary content-addressable memory (TCAM), dynamic random-access memory (DRAM), and static random-access memory (SRAM).

The memory 156 is operable to store the instructions 158, information relating to data interactions 162, data properties 164 associated with data stored in the computing infrastructure and/or associated with a data interaction 162, one or more data obfuscating algorithms 166, a plurality of obfuscation levels 170, a plurality of data sensitivity levels 170, sample data 172, synthetic data 174, data tumbler 176, one or more machine learning algorithms 178, and any other data needed to performed operations of the security manager 150 as described in embodiments of the present disclosure. The instructions 158 may include any suitable set of instructions, logic, rules, or code operable to execute the security manager 150.

The network interface 154 is configured to enable wired and/or wireless communications. The network interface 154 is configured to communicate data between the security manager 150 and other devices, systems, or domains (e.g., computing nodes 104). For example, the network interface 154 may include a Wi-Fi interface, a LAN interface, a WAN interface, a modem, a switch, or a router. The processor 152 is configured to send and receive data using the network interface 154. The network interface 154 may be configured to use any suitable type of communication protocol as would be appreciated by one of ordinary skill in the art.

It may be noted that each of the computing nodes 104 may be implemented like the security manager 150 shown in FIG. 1. For example, each of the computing nodes 104 may have a respective processor and a memory that stores data and instructions to perform a respective functionality of the computing node 104.

Obfuscating Data to Avoid Data Theft

The security manager 150 may be configured to identify sensitive data associated with a data interaction 162 performed in the computing infrastructure and obfuscate at least a portion of the identified data to avoid a bad actor from stealing data. For example, as described above, bad actors may tap into the network 190 and steal data (e.g., real-world data 202 shown in FIG. 2) transiting the network 190 as part of a data interaction 162 performed in the computing infrastructure 102. In this context, the security manager 150 may be configured to monitor data transiting the network 190 and obfuscate at least a portion of the data in real-time to avoid a bad actor from stealing meaningful data.

Figure 2:
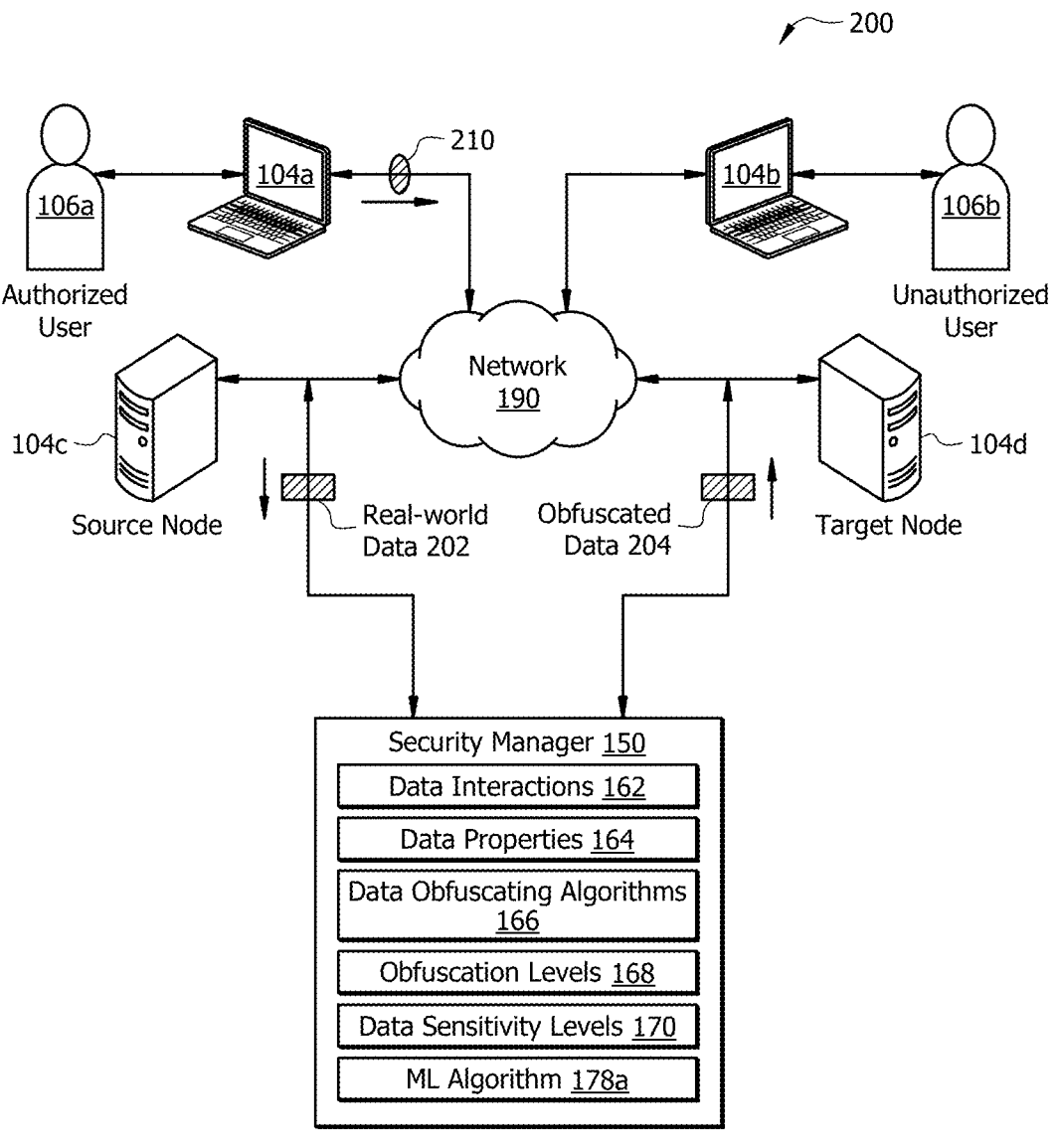
FIG. 2 illustrates an example system for obfuscating data transiting a data network, in accordance with certain embodiments of the present disclosure.

FIG. 2 illustrates an example system 200 for obfuscating data transiting a data network (e.g., network 190), in accordance with certain embodiments of the present disclosure.

In one or more embodiments, the security manager 150 may be configured to monitor data interactions 162 performed in the computing infrastructure 102 (shown in FIG. 1). An authorized user 106a may be registered to perform one or more data interactions 162 in the computing infrastructure 102. A typical data interaction 162 performed in the computing infrastructure 102 includes transmission of data (e.g., real-world data 202) between two or more computing nodes 104 via the network 190. For example, sending an email by a first user to a second user may include transmission of email data from a first email server associated with the first user to a second email server associated with the second user. The data transiting through the network 190 may include sensitive data that only authorized users 106a and/or systems are allowed to view. In some cases, an unauthorized user 106b may gain access to the network 190 using unauthorized techniques and extract the data (e.g., real-world data 202) transiting the network 190. In the context of the present disclosure, an unauthorized user 106b in relation to a particular piece of data is any person who does not have authorization to access and/or view the particular piece of data. Further, obfuscating data may refer to modifying data in a way that avoids unauthorized users 106b (e.g., a hacker) from extracting useful (e.g., sensitive) information from the data.

As shown in FIG. 2, an authorized user 106a may initiate a data interaction 162 by transmitting a request 210 from a user device 104a to a processing server (e.g., target node 104d) that is responsible to process the request 210. The authorized user 106a may be any user 106 who is authorized to perform the data interaction 162. In one embodiment, the user device 104a and the processing server configured to process the request 210 may be computing nodes 104 of the computing infrastructure 102 connected to the network 190. For example, the authorized user 106a may use a webmail application installed on the user device 104a to place a request 210 for retrieving emails associated with an email account of the authorized user 106a. In this example, when the authorized user 106a enters a login name and a password associated with the email account in the webmail application on the user device 104a, a request 210 is generated and transmitted from the user device 104a to a processing email server (e.g., target node 104d) for emails associated with the email account, wherein the request 210 includes the login name and password entered by the authorized user 106a. The data interaction 162 requested by the authorized user 106a may include transmission of data (e.g., real-world data 202) between two or more computing nodes 104 via the network 190. Following the above example, upon receiving the request 210 from the user device 104a, the email processing server (e.g., target node 104d) verifies the login name and password entered by the authorized user 106a (as included in the requests 210) and, upon successful verification, retrieves email data (e.g., real-world data 202) associated with the email account of the authorized user 106a from an email database (e.g., source node 104c) that is configured to store email data associated with email accounts of a plurality of users 106. Once the email data is retrieved from the email database (e.g., source node 104c), the email processing server (e.g., target node 104d) transmits the retrieved email data to the user device 104a for rendering and displaying by the webmail application. Thus, in this example, as part of the requested data interaction 162, email data (e.g., real-world data 202) associated with the authorized user 106a is transmitted between the email database (e.g., source node 104c) and the email processing server (e.g., target node 104d), as well as between the email processing server (e.g., target node 104d) and the user device 104a.

The security manager 150 may be configured to obfuscate at least a portion of the real-world data 202 transmitted between computing nodes 104 of the computing infrastructure 102. In the context of the present disclosure, the term "real-world data" refers to any legitimate data that is stored in the computing infrastructure 102, processed in the computing infrastructure 102, and/or or transmitted between computing nodes 104 of the computing infrastructure. The real-world data 202 transiting the network 190 between two computing nodes 104 (e.g., source node 104c and target node 104d) may include sensitive information which only authorized users 106a are allowed to access/view. By obfuscating the real-world data 202 or portions thereof (e.g., portions containing sensitive data), sensitive data may be protected from being stolen by an unauthorized user 106b.

In one or more embodiments, in response to detecting that an authorized user 106a has initiated a data interaction 162, the security manager 150 may start monitoring the network 190 for unauthorized access (e.g., cyber-attacks). The security manager 150 may be configured to use one or more of any existing or known techniques for detecting unauthorized access to the network 190. For example, the security manager 150 may be configured to detect when an unauthorized user 106b (a hacker) taps into the network 190 or a portion thereof. In one embodiment, user device 104b may represent a computing node 104 that the unauthorized user 106b may use to gain unauthorized access to the network 190. The techniques that may be used to detect unauthorized access of the network 190 is out of the scope of this disclosure and will not be described herein. In response to detecting that an unauthorized access to the network 190 has occurred, the security manager 150 may be configured to obfuscate at least a portion of the real-world data 202 associated with the data interaction 162 that is transiting the network 190. For example, security manager 150 may detect that a network link between the source node 104c and the target node 104d has been hacked into by an unauthorized user 106b. In response to detecting that the network link between the source node 104c and the target node 104d has been compromised, the security manager 150 may intercept the real-world data 202 originating from the source node and obfuscate at least a portion of the real-world data 202 using one or more data obfuscation algorithms 166 to generate obfuscated data 204. The obfuscated data 204 is then injected back into the network 190 on to the network link for transmission to the target node 104d. Thus, the unauthorized user 106b who has unauthorized access to the network 190 can only access the obfuscated data 204 that does not include any useful information (e.g., sensitive data). Essentially, the security manager 150 obfuscates the real-world data 202 before the unauthorized user 106b can access it via the network 190, thus avoiding the real-world data 202 from being stolen by the unauthorized user 106b.

In one or more embodiments, the data obfuscation algorithms 166 that may be used by the security manager 150 to obfuscate the real-world data 202 may include one or more of masking, encryption, substitution, data tokenization, shuffling, nulling, randomization, anonymization, blurring, scrambling, or any other known data obfuscation technique.

In one embodiment, in conjunction with injecting the obfuscated data 204 into the network 190, the security manager 150 may be configured to transmit un-obfuscated real-world data 202 to the target node 104d over an alternative secure network link (not shown) that is not compromised. In an alternative or additional embodiment, the security manager 150 obfuscates the real-world data 202 in a way that allows the target node 104d to extract useful data from the obfuscated data 204. For example, the target node 104d may use a key which only the target node 104d possesses which allows the target node 104d to decrypt the obfuscated data 204 and extract real-world data 202 that was originally transmitted by the source node 104c.

In one or more embodiments, the security manager 150 is configured to perform the entire process starting from intercepting real-world data 202 transmitted by the source node 104c to injecting the obfuscated data 204 back into the network 190 in real-time or near real-time. Performing these operations in real-time or near real-time allows the security manager 150 to minimize delays in transmission of data between the source node 104c and the target node 104d. Additionally, performing these operations in real-time or near real-time may avoid the unauthorized user 106b from discovering that the data obtained by the unauthorized user 106b is obfuscated data 204 and not the real-world data 202. In this context, security manager 150 may be configured to obfuscate the real-world data 202 such that the obfuscated data 204 mimics the real-world data 202. In the context of the present disclosure, mimicking the real-world data 202 means that the obfuscated data 204 generally has the same or similar data properties 164 (e.g., format) associated with the real-world data 202 but includes different data values (e.g., synthetic data values) from the real-world, so that the unauthorized user 106b cannot discover that any data obfuscation has taken place. In other words, the obfuscated data 204 looks like the real-world data 202 but does not include any of the real-world information contained in the real-world data 202. In one embodiment, the security manager 150 may use an ML algorithm 178a (e.g., implementing artificial intelligence algorithm such as generative AI algorithm) to generate obfuscated data 204 including obfuscated data 204 that mimics the real-world data 202.

In one or more embodiments, the security manager 150 may be configured to identify sensitive data included in the real-world data 202. For example, the entire real-world data transmitted by the source node 104c may not be considered (e.g., designated) sensitive data. In such a case, obfuscating the entire real-world data 202 may unnecessarily waste processing resources and may introduce longer delays in transmission of the real-world data 202 from the source node 104c to the target node 104d. It is important to minimize delays introduced by the obfuscation process as the obfuscation is performed in real-time or near real-time. In one embodiment, the security manager 150 may use the ML algorithm 178a (e.g., implementing artificial intelligence algorithm such as generative AI algorithm) to identify portions of the real-world data 202 that includes data designated as sensitive data. Once one or more portions of the real-world data 202 are identified as including sensitive data, the security manager 150 may be configured to obfuscate only those identified portions while leaving the remaining portion of the real-world data un-obfuscated. By identifying portions of the real-world data 202 that include sensitive data and obfuscating only the identified portions, the disclosed system and methods save processing resources that would otherwise be used to obfuscate the entire real-world data. Saving processing resources improves processing efficiency of a computing node that implements the security manager 150 as the real-world data 202 may be processed faster. Further, faster obfuscation of the real-world data 202 causes reduced network delays as the obfuscated data 204 may be injected back into the network 190 faster. The reduced network delay improves network efficiency of the network 190.

In one or more embodiments, the security manager 150 may be configured to assign one or more obfuscation levels 168 to the real-world data 202. In the context of the present disclosure, an obfuscation level 168 is indicative of a degree of data obfuscation that is to be applied to the real-world data 202. For example, a higher obfuscation level 168 means that a higher degree of data obfuscation is applied to the real-world data. In other words, a higher obfuscation level 168 modifies the real-world data 202 to a greater extent as compared to a lower obfuscation level 168. In one embodiment, a plurality of obfuscation levels 168 may be defined, wherein a plurality of the data obfuscation algorithms 166 are grouped into the plurality of obfuscation levels 168. In other words, each obfuscation level 168 is associated with a particular group of one or more data obfuscation algorithms 166. A higher obfuscation level 168 is generally associated with data obfuscation algorithms 166 that more severely obfuscate data as compared to data obfuscation algorithms 166 associated with a lower obfuscation level 168. That is, the data obfuscating algorithms 166 associated with a higher obfuscating level 168 are configured to apply a higher level (e.g., more severe) of data obfuscation as compared to the data obfuscating algorithms 166 associated with a lower obfuscating level 168.

In one or more embodiments, the security manager 150 may be configured to assign a particular obfuscation level 168 to the real-world data 202 or a portion thereof based on a data sensitivity level 170 associated with the respective real-world data 202 or the portion thereof. A data sensitivity level 170 associated with a piece of data (e.g., real-world data 202 or a portion thereof) is indicative of a degree of confidentiality that is to be maintained with respect to the piece of data. In this context, a plurality of data security levels 170 may be defined wherein, a higher data sensitivity level 170 means that a piece of data requires a higher degree of confidentiality to be maintained as compared to another piece of data that is associated with a lower data sensitivity level 170. The security manager 150 may be configured to assign a particular data sensitivity level to the real-world data 202 or a portion thereof based on one or more data properties 164 associated with the respective real-world data 202 or the portion thereof. The data properties 164 associated with a piece of data are indicative of the nature of the data and a degree of sensitivity the data is known to possess. In one embodiment, the security manager 150 may use the ML algorithm 178a (e.g., implementing artificial intelligence algorithm such as generative AI algorithm) to identify a type of data and assign an appropriate data sensitivity level 170 to the data. Each data sensitivity level 170 may be associated with a particular obfuscation level 168, wherein a higher data sensitivity level 170 is associated with a higher obfuscation level 168.

Once a particular data sensitivity level 170 associated with a piece of data (e.g., real-world data 202 or a portion thereof) has been determined, the security manager 150 may be configured to identify an obfuscation level 168 associated with the particular data sensitivity level 170 and generate the obfuscated data 204 by obfuscating the piece of data (e.g., real-world data 202 or the portion thereof) using one or more data obfuscation algorithms 166 associated with the identified obfuscation level 168.

The security manager 150 may be configured to identify and assign different obfuscation levels 168 to different portions of the real-world data 202 depending on the data sensitivity levels 170 associated with the respective portions of the real-world data 202. For example, the security manager 150 may determine that a first portion of the real-world data 202 is associated with a first data sensitivity level 170 and that a second portion of the real-world data 202 is associated with a second data sensitivity level 170. As described, the security manager 150 may determine the data sensitivity levels 170 of the two portions of the real-world data 202 based on one or more data properties 164 of the respective portions. Once the data sensitivity levels 170 of the two portions of the real-world data 202 has been determined, the security manager 150 may identify obfuscating levels 168 for each of the two portions based on the respective data sensitivity levels 170. For example, the security manager 150 may identify a first obfuscating level 168 associated with the first data sensitivity level 170 and may identify a second obfuscating level 168 associated with the second data sensitivity level 170. Thereafter, the security manager 150 may generate the obfuscated data 204 by obfuscating the first portion of the real-world data using one or more data obfuscating algorithms 166 associated with the first obfuscating level and obfuscating the second portion of the real-world data using one or more data obfuscating algorithms 166 associated with the second obfuscating level. Thus, the obfuscated data 204 includes the first and the second portions of the real-world data obfuscated at different respective obfuscation levels 168.

In an additional or alternative embodiment, the security manager 150 may determine that a particular portion of the real-world data 202 includes no sensitive data and may not obfuscate the particular portion.

By identifying different obfuscating levels 168 for different portions of the real-world data 202 and obfuscating the different portions by different levels, the disclosed system and methods save processing resources that would otherwise be used to obfuscate the entire real-world data at a higher obfuscating level 168. Saving processing resources improves processing efficiency of a computing node that implements the security manager 150 as the real-world data 202 may be processed faster. Further, faster obfuscation of the real-world data 202 causes reduced network delays as the obfuscated data 204 may be injected back into the network 190 faster. The reduced network delay improves network efficiency of the network 190.

In one embodiment, the security manager 150 may be configured to proactively obfuscate the real-world data 202 or portions thereof without detecting unauthorized access to the network. For example, the real-world data 202 or portions thereof may be obfuscated when the respective real-world data 202 or portions thereof is associated with one or more pre-selected data sensitivity levels 170. In an alternative or additional embodiment, the security manager 150 may be configured to proactively obfuscate the real-world data 202 or portions thereof in response to detecting that the real-world data 202 or a portions thereof is transiting a portion of the network 190 known be prone to cyber-attacks and data security breaches. For example, proactive obfuscation may be applied to data transiting certain geographical regions that are known to be prone to data security breaches.

It may be noted that while the disclosed techniques are discussed in the context of real-world data 202 transiting the network 190 between the source node 104c and the target node 104d, the techniques apply to any data transiting the network 190 between any two computing nodes 104 of the computing infrastructure 102.

Proactively Generating Synthetic Data to Avoid Theft of Data

Figure 3:
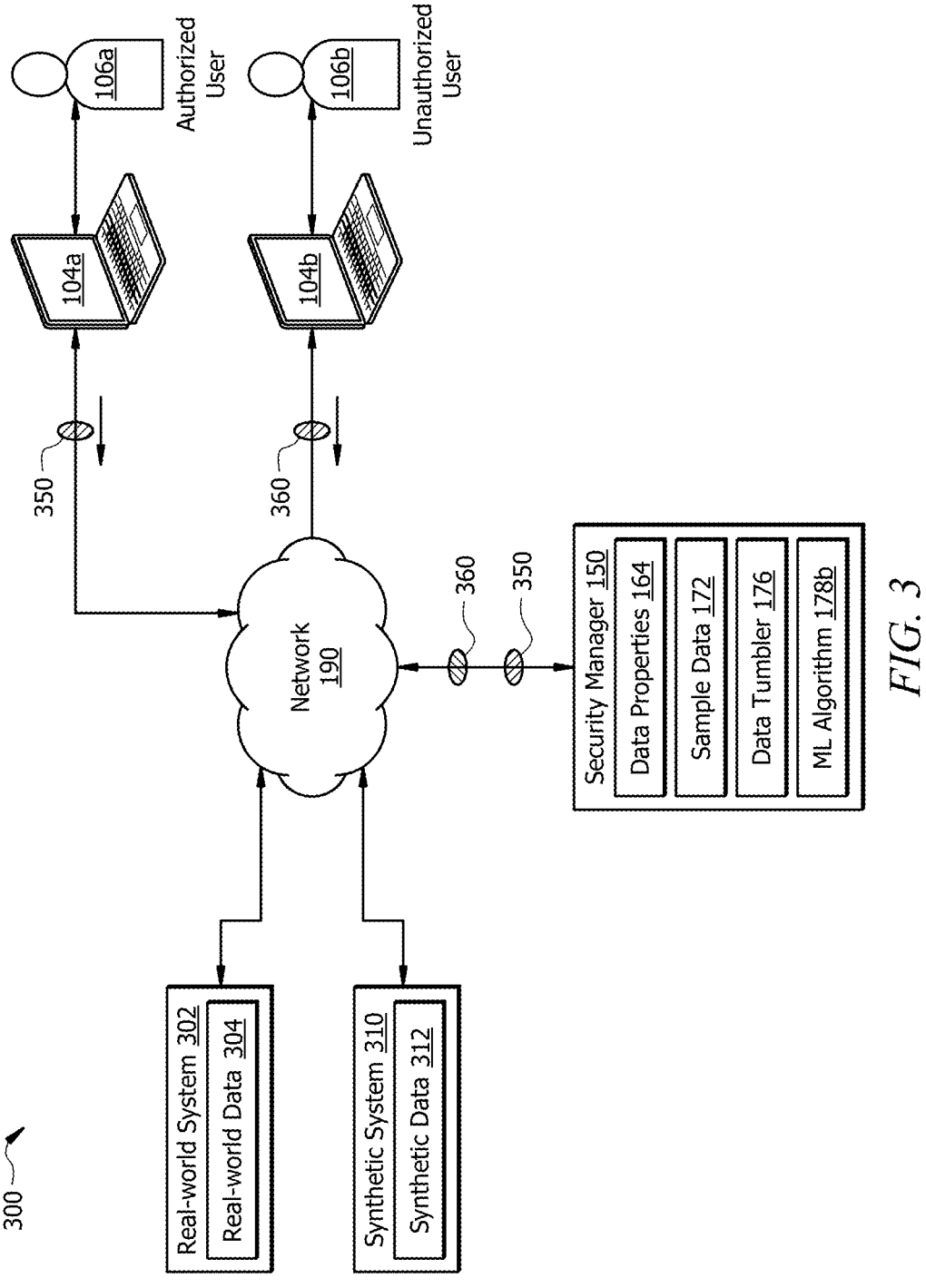
FIG. 3 illustrates an example system for generating synthetic data based on real-world data, in accordance with certain embodiments of the present disclosure.

FIG. 3 illustrates an example system 300 for generating synthetic data based on real-world data, in accordance with certain embodiments of the present disclosure.

In one or more embodiments of the present disclosure, the security manager may be configured to generate synthetic data (e.g., synthetic data 312) that at least partially mimics real-world data (e.g., real-world data 304) and divert unauthorized accesses of the real-world data 304 to the synthetic data 312. This avoids a bad actor from gaining access to the real-world data 304 that may include sensitive information. Further, since the synthetic data 312 mimics the properties (e.g., data properties 164) of the real-world data 304, the bad actor may not distinguish the synthetic data 312 from the real-world data 304 and may not discover that the bad actor has accessed the synthetic data 312 instead of the real-world data 304. In one embodiment, real-world data 304 may be same or similar to real-world data 202 described above with reference to FIG. 2. In the context of the present disclosure, the term "synthetic data" refers to artificial data or fake data generated to mimic real data (e.g., real-world data 304). In one embodiment, the security manger 150 may be configured to generate synthetic data 312 that has the same or similar data properties 164 as the real-world data 304 but does not include any actual and/or useful information. For example, the synthetic data 312 is similar in structure, features, and characteristics to the real-world data 304 used in real-world applications (e.g., in a real-world system 302), but does not include any actual information contained in the real-world data 304. Mimicking the real-world data 202 means that the synthetic data 312 generally has the same or similar data properties 164 (e.g., format) associated with the real-world data 304 but includes different data values (e.g., synthetic data values) from the real-world data 304, so that the unauthorized user 106b cannot distinguish the synthetic data 312 from the real-world data 304.

As further described in embodiments of the present disclosure, the security manager 150 may be configured to proactively generate synthetic data 312 that mimics real-world data 304 associated with (e.g., stored in) a real-world system 302. In one embodiment, the real-world system 302 may be a computer system such as a production system where software products are deployed and made available to users 106 for performing a plurality of data interactions (e.g., data interactions 162 shown in FIG. 1). As described above, the term "real-world data" refers to any legitimate data that is stored in the computing infrastructure 102 (e.g., in a real-world system 302), processed in the computing infrastructure 102 (e.g., in a real-world system 302), and/or or transmitted between computing nodes 104 of the computing infrastructure 102. In an alternate or additional embodiment, the real-world system 302 may include, but is not limited to, a database, a data center, a data lake, a hard drive, a temporary memory such as a random-access memory (RAM) or cache memory, or any known memory device. In one embodiment, the real-world system 302 and the synthetic system 310 are computing nodes 104 communicatively coupled to the network 190 as part of the computing infrastructure 102 shown in FIG. 1.

In one or more embodiments, the security manager 150 may be configured to generate synthetic data 312 that at least partially mimics the real-world data 304 in response to receiving a request 350 from an authorized user 106a. For example, the authorized user 106a may use a user device 104a to generate and transmit a request 350 to generate synthetic data 312 based on real-world data 304 stored in the real-world system 302. For example, the request 350 may request that the generated synthetic data 312 at least partially mimics the real-world data 304 to avoid an unauthorized user 106b from distinguishing the synthetic data 312 from the real-world data 304. In response to receiving the request 350, the security manager 150 may be configured to access the real-world system 302 (e.g., access a memory device that stores the real-world data 304) and extract at least a portion of the real-world data 304 for use as sample data 172 when generating the synthetic data 304. In one embodiment, the authorized user 106a may provide or indicate a specific portion of the real-world data 304 that is to be used as the sample data 172. For example, the request 350 may include a database query (e.g., SQL query) that is configured to extract a portion of the real-world data 304 stored in a database associated with the real-world system 302. The security manager 150 may be configured to run the query in the database associated with the real-world system 302 to extract the sample data 172.

In one embodiment, the authorized user 106a who initiated the request 350 may configure the query as a means to provide the sample data 172, wherein the generated synthetic data 312 is to align with data properties 164 associated with the sample data 172. Thus, providing the sample data 172 allows the authorized user 106a to define data properties 164 of the synthetic data 312 desired by the authorized user 106a. For example, when the authorized user 106a desires to generate a million synthetic employee data records mimicking employee data records in a production employee database table stored in the real-world system 302, the authorized user 106a may provide sample data 172 (e.g., via a query in the request 350) that includes 100 employee records from the production employee database table. Based on the sample data 172 provided by the authorized user 106a, the security manager 150 may generate the requested million synthetic employee data records that adhere to the data properties 164 of the sample employee data records.

Once the sample data 172 has been obtained from the real-world system 302, the security manager 150 may be configured to determine data properties 164 of the real-world data 304 based on the sample data 172. For example, the security manager 150 may be configured to analyze the sample data 172 to determine data properties 164 of the real-world data 304 included in the sample data 172. For example, when the real-world system 302 is an employee record database and the real-world data 304 includes employee data records of an employee database table, the data properties 164 associated with the sample data 172 determined by the security manager 150 may include statistical and structural properties of the real-world data 304 included in the sample data 172 such as data distribution in the production database table, null distribution in the production database table, correlation among attributes of the production database table, identification and categorization of sensitive data in the production database table, outliers and anomalies in the production database table, correlations between columns of the production database table, formats of one or more fields in the production database table that are to be replicated in synthetic data 312, or a combination thereof. For example, the data properties 164 extracted from the sample data 172 may include format of certain data types (e.g., data attributes/columns) such as a date format of employee joining date, format of employee ID, currency type of employee compensation etc. Additionally, or alternatively, the data properties 164 may include table metadata associated with a database table that stores the real-world data 304. The security manager 150 may be configured to obtain table metadata associated with the database table that stores the real-world data 304. The table metadata includes information about the real-world data 304 stored in the database table, such as origin, format, quality, and usage of real-world data 304. For example, table metadata associated with a database table may include structured information that provides additional details about the real-world data 304 stored in the database table such as data attributes (e.g., columns) included in the database table, data types, field names, and relationships. In one embodiment, the security manager 150 may be configured to extract table metadata of the database table from a metadata catalog (not shown) associated with database stored in the real-world system 302.

Once the data properties 164 of the real-world data 304 have been determined (e.g., based on the sample data 172), the security manager 150 may be configured to generate synthetic data 312 that satisfies the data properties 164 of the real-world data 304. In other words, the security manager 150 generates synthetic data 312 whose data properties 164 at least partially match with the data properties of the real-world data 304, which causes the synthetic data 312 to at least partially mimic the real-world data 304.

In one or more embodiments, the security manager may be configured to use an ML algorithm 178b (e.g., a generative AI algorithm) to generate the synthetic data 312. In this context, the ML algorithm 178b may be trained to generate synthetic data 312 based on data properties 164 associated with the real-world data 304. The security manager 150 may be configured to input into the ML algorithm 178b, the data properties 164 of the real-world data 304. The security manager 150 may obtain the synthetic data as an output of the ML algorithm 178b.

As noted above, the security manager 150 may be configured to divert unauthorized accesses of the real-world data 304 to the synthetic data 312 to avoid a bad actor from gaining access to the real-world data 304 that may include sensitive information. For example, an unauthorized user 106b (e.g., a hacker) may use a user device 104b to place an unauthorized request 360 to access the real-world data 304. In response to detecting that the unauthorized user 106b is attempting to access the real-world data 304 (e.g., in response to detecting the unauthorized request 360), the security manager 150 may be configured to provide the unauthorized user 106b access to the synthetic data 312 that mimics the real-world data 304, instead of providing access to the real-world data 304. This essentially may distract and/or mislead the unauthorized user 106b and may avoid theft of the real-world data 304 or a portion thereof.

In one embodiment, the security manager 150 may be configured to store the synthetic data 312 in a synthetic system 310 that is different from the real-world system. In one embodiment, the synthetic system 310 may be a computer system (e.g., a computing node 104) that is configured to mimic the real-world system 302. In an alternative or additional embodiment, the synthetic system 302 may include, but is not limited to, a database, a data center, a data lake, a hard drive, a temporary memory such as a random-access memory (RAM) or cache memory, or any known memory device. For example, when the real-world system 302 is a real-world database that stores real-world database tables including the real-world data 304, the synthetic system 310 may be a synthetic database that mimics the real-world database, may include synthetic database tables that mimic the real-world database table, and store the synthetic data 312 that mimic the real-world data 304. In another example, when the real-world system 302 is a production system that runs real-world software applications to perform real-world data interactions, the synthetic system 310 may be a sandbox environment that mimics the real-world production system. In one embodiment, the security manager 150 may be configured to generate the synthetic system 310 to at least partially mimic the real-world system 302. For example, when the real-world system 302 is a production system, the security manager 150 may be configured to generate the synthetic system 310 based on the real-world data 304 (e.g., data properties 164 associated with the real-world data 304 that define the structure of the real-world system) such that the synthetic system 310 mimics the real-world system 302.

When an unauthorized access to the real-world system 302 (e.g., by an unauthorized user 106b) is detected, the security manager 150 may be configured to provide the unauthorized user 106b access to the synthetic system 310 instead of the real-world system 302. By diverting the unauthorized access to a different system, the security manager 150 may provide physical and/or logical separation between the real-world system 302 and the synthetic system 310 and thus avoids the unauthorized user 106b from gaining access to the real-world system 302 or any portion thereof. For example, the real-world system 302 (e.g., a production system or a portion thereof) may be implemented by a first data server of the computing infrastructure 102 and the synthetic system 310 (e.g., a sandbox environment) may be implemented by a second data server of the computing infrastructure 102 that is different from the first data server. Further, since the synthetic system 310 mimics the real-world system 302, the unauthorized user may not distinguish the synthetic system 310 from the real-world system 302.

In one or more embodiments, the security manager 150 may generate the synthetic data 312 using a data tumbler 176. In the context of the present disclosure the data tumbler 176 is a software program that is configured to generate the synthetic data 312 by mixing up several pieces of data such that the information contained in the individual pieces of data are unrecognizable and uninterpretable. For example, the synthetic manager may input into the data tumbler 176 the real-world data 304 or a portion thereof along with one or more second pieces of data and obtain the synthetic data 312 as an output of the data tumbler. In one embodiment, the one or more second pieces of data may be other pieces of real-world data 304 or synthetic data 312. For example, the security manager 150 may obtain the one or more of the second pieces of data from another real-world system 302 or another synthetic system 310.

In one embodiment, at least a portion of the synthetic data 312 may include obfuscated data (e.g., obfuscated data 204 shown in FIG. 2). For example, generating the synthetic data 312 may include obfuscating at least a portion of the real-world data 304 to generate obfuscated data and including the obfuscated data as part of the synthetic data 312. The security manager 150 may be configured to obfuscate the real-world data 304 or a portion thereof as described with reference to FIG. 2.

FIG. 4 illustrates a flowchart of an example method 400 for obfuscating data (e.g., real-world data 202), in accordance with one or more embodiments of the present disclosure. Method 400 may be performed by the security manager 150 shown in FIG. 1. The following description relating to method 400 also refers back to elements illustrated in FIG. 2.

At operation 402, the security manager 150 detects that an authorized user 106a (shown in FIG. 2) has initiated a data interaction 162, wherein the data interaction 162 includes a transmission of data (e.g., real-world data 202) over a data network (e.g., network 190) from a source node 104c (shown in FIG. 2) to a target node 104d (shown in FIG. 2).

As described above with reference to FIG. 2, an authorized user 106a may initiate a data interaction 162 by transmitting a request 210 from a user device 104a to a processing server (e.g., target node 104d) that is responsible to process the request 210. The authorized user 106a may be any user 106 who is authorized to perform the data interaction 162.

At operation 404, the security manager 150 detects that an unauthorized access to the data network (e.g., network 190) has occurred.

As described above with reference to FIG. 2, in response to detecting that an authorized user 106a has initiated a data interaction 162, the security manager 150 may start monitoring the network 190 for unauthorized access (e.g., cyber-attacks). The security manager 150 may be configured to use one or more of any existing or known techniques for detecting unauthorized access to the network 190. For example, the security manager 150 may be configured to detect when an unauthorized user 106b (a hacker) taps into the network 190 or a portion thereof.

At operation 406, in response to detecting the unauthorized access to the data network (e.g., network 190), the security manager 150 obfuscates, in real-time, at least a portion of the data (e.g., real-world data 202) transiting via the data network. Obfuscating the data includes intercepting the data originating from the source node 104c, generating obfuscated data 204 by obfuscating the data relating to the data interaction 162 using one or more data obfuscation algorithms 166, and transmitting the obfuscated data 204 over the data network to the target node 104d.

As described above with reference to FIG. 2, in response to detecting that an unauthorized access to the network 190 has occurred, the security manager 150 may be configured to obfuscate at least a portion of the real-world data 202 associated with the data interaction 162 that is transiting the network 190. For example, security manager 150 may detect that a network link between the source node 104c and the target node 104d has been hacked into by an unauthorized user 106b. In response to detecting that the network link between the source node 104c and the target node 104d has been compromised, the security manager 150 may intercept the real-world data 202 originating from the source node and obfuscate at least a portion of the real-world data 202 using one or more data obfuscation algorithms 166 to generate obfuscated data 204. The obfuscated data 204 is then injected back into the network 190 on to the network link for transmission to the target node 104d. Thus, the unauthorized user 106b who has unauthorized access to the network 190 can only access the obfuscated data 204 that does not include any useful information (e.g., sensitive data). Essentially, the security manager 150 obfuscates the real-world data 202 before the unauthorized user 106*b* can access it via the network 190, thus avoiding the real-world data 202 from being stolen by the unauthorized user 106*b*.

In one or more embodiments, the data obfuscation algorithms 166 that may be used by the security manager 150 to obfuscate the real-world data 202 may include one or more of masking, encryption, substitution, data tokenization, shuffling, nulling, randomization, anonymization, blurring, scrambling, or any other known data obfuscation technique.

In one embodiment, in conjunction with injecting the obfuscated data 204 into the network 190, the security manager 150 may be configured to transmit un-obfuscated real-world data 202 to the target node 104*d* over an alternative secure network link (not shown) that is not compromised. In an alternative or additional embodiment, the security manager 150 obfuscates the real-world data 202 in a way that allows the target node 104*d* to extract useful data from the obfuscated data 204. For example, the target node 104*d* may use a key which only the target node 104*d* possesses which allows the target node 104*d* to decrypt the obfuscated data 204 and extract real-world data 202 that was originally transmitted by the source node 104*c*.

In one or more embodiments, the security manager 150 is configured to perform the entire process starting from intercepting real-world data 202 transmitted by the source node 104*c* to injecting the obfuscated data 204 back into the network 190 in real-time or near real-time. Performing these operations in real-time or near real-time allows the security manager 150 to minimize delays in transmission of data between the source node 104*c* and the target node 104*d*. Additionally, performing these operations in real-time or near real-time may avoid the unauthorized user 106*b* from discovering that the data obtained by the unauthorized user 106*b* is obfuscated data 204 and not the real-world data 202. In this context, security manager 150 may be configured to obfuscate the real-world data 202 such that the obfuscated data 204 mimics the real-world data 202. In the context of the present disclosure, mimicking the real-world data 202 means that the obfuscated data 204 generally has the same or similar data properties 164 (e.g., format) associated with the real-world data 202 but includes different data values (e.g., synthetic data values) from the real-world, so that the unauthorized user 106*b* cannot discover that any data obfuscation has taken place. In other words, the obfuscated data 204 looks like the real-world data 202 but does not include any of the real-world information contained in the real-world data 202. In one embodiment, the security manager 150 may use an ML algorithm 178*a* (e.g., implementing artificial intelligence algorithm such as generative AI algorithm) to generate obfuscated data 204 including obfuscated data 204 that mimics the real-world data 202.

FIG. 5 illustrates a flowchart of an example method 500 for protecting sensitive information, in accordance with one or more embodiments of the present disclosure. Method 500 may be performed by the security manager 150 shown in FIG. 1. The following description relating to method 500 also refers back to elements illustrated in FIG. 3.

At operation 502, the security manager 150 receives a request 350 (shown in FIG. 3) to generate synthetic data 312 (also shown in FIG. 3) based on real-world data 304 (also shown in FIG. 3) stored in a first memory (e.g., real-world system 302 shown in FIG. 3), wherein the synthetic data 312 at least partially mimics the real-world data 304.

As described above with reference to FIG. 3, the security manager 150 may be configured to proactively generate synthetic data 312 that mimics real-world data 304 associated with (e.g., stored in) a real-world system 302. In one embodiment, the real-world system 302 may be a computer system such as a production system where software products are deployed and made available to users 106 for performing a plurality of data interactions (e.g., data interactions 162 shown in FIG. 1). As described above, the term "real-world data" refers to any legitimate data that is stored in the computing infrastructure 102 (e.g., in a real-world system 302), processed in the computing infrastructure 102 (e.g., in a real-world system 302), and/or or transmitted between computing nodes 104 of the computing infrastructure 102. In an alternate or additional embodiment, the real-world system 302 may include, but is not limited to, a database, a data center, a data lake, a hard drive, a temporary memory such as a random-access memory (RAM) or cache memory, or any known memory device. In one embodiment, the real-world system 302 and the synthetic system 310 are computing nodes 104 communicatively coupled to the network 190 as part of the computing infrastructure 102 shown in FIG. 1.

In one or more embodiments, the security manager 150 may be configured to generate synthetic data 312 that at least partially mimics the real-world data 304 in response to receiving a request 350 from an authorized user 106*a*. For example, the authorized user 106*a* may use a user device 104*a* to generate and transmit a request 350 to generate synthetic data 312 based on real-world data 304 stored in the real-world system 302. For example, the request 350 may request that the generated synthetic data 312 at least partially mimics the real-world data 304 to avoid an unauthorized user 106*b* from distinguishing the synthetic data 312 from the real-world data 304.

At operation 504, in response to receiving the request 350, the security manager 150 accesses the first memory (e.g., real-world system 302) to extract at least a portion of the real-world data 304, wherein the extracted portion of the real-world data 304 is to be used as sample data 172 (shown in FIG. 3) for generating the synthetic data 312.

As described above with reference to FIG. 3, in response to receiving the request 350, the security manager 150 may be configured to access the real-world system 302 (e.g., access a memory device that stores the real-world data 304) and extract at least a portion of the real-world data 304 for use as sample data 172 when generating the synthetic data 304. In one embodiment, the authorized user 106*a* may provide or indicate a specific portion of the real-world data 304 that is to be used as the sample data 172. For example, the request 350 may include a database query (e.g., SQL query) that is configured to extract a portion of the real-world data 304 stored in a database associated with the real-world system 302. The security manager 150 may be configured to run the query in the database associated with the real-world system 302 to extract the sample data 172.

In one embodiment, the authorized user 106*a* who initiated the request 350 may configure the query as a means to provide the sample data 172, wherein the generated synthetic data 312 is to align with data properties 164 associated with the sample data 172. Thus, providing the sample data 172 allows the authorized user 106*a* to define data properties 164 of the synthetic data 312 desired by the authorized user 106*a*. For example, when the authorized user 106*a* desires to generate a million synthetic employee data records mimicking employee data records in a production employee database table stored in the real-world system 302, the authorized user 106*a* may provide sample data 172 (e.g., via a query in the request 350) that includes 100 employee records from the production employee database table. Based on the sample data 172 provided by the authorized user 106*a*, the security manager 150 may generate the requested million synthetic employee data records that adhere to the data properties 164 of the sample employee data records.

At operation 506, the security manager 150 determines data properties 164 (shown in FIG. 3) of the real-world data 304 based on the sample data 172 extracted from the first memory (e.g., real-world system 302).

As described above with reference to FIG. 3, once the sample data 172 has been obtained from the real-world system 302, the security manager 150 may be configured to determine data properties 164 of the real-world data 304 based on the sample data 172. For example, the security manager 150 may be configured to analyze the sample data 172 to determine data properties 164 of the real-world data 304 included in the sample data 172. For example, when the real-world system 302 is an employee record database and the real-world data 304 includes employee data records of an employee database table, the data properties 164 associated with the sample data 172 determined by the security manager 150 may include statistical and structural properties of the real-world data 304 included in the sample data 172 such as data distribution in the production database table, null distribution in the production database table, correlation among attributes of the production database table, identification and categorization of sensitive data in the production database table, outliers and anomalies in the production database table, correlations between columns of the production database table, formats of one or more fields in the production database table that are to be replicated in synthetic data 312, or a combination thereof. For example, the data properties 164 extracted from the sample data 172 may include format of certain data types (e.g., data attributes/columns) such as a date format of employee joining date, format of employee ID, currency type of employee compensation etc. Additionally, or alternatively, the data properties 164 may include table metadata associated with a database table that stores the real-world data 304. The security manager 150 may be configured to obtain table metadata associated with the database table that stores the real-world data 304. The table metadata includes information about the real-world data 304 stored in the database table, such as origin, format, quality, and usage of real-world data 304. For example, table metadata associated with a database table may include structured information that provides additional details about the real-world data 304 stored in the database table such as data attributes (e.g., columns) included in the database table, data types, field names, and relationships. In one embodiment, the security manager 150 may be configured to extract table metadata of the database table from a metadata catalog (not shown) associated with database stored in the real-world system 302.

At operation 508, the security manager 150 generates, based on the data properties 164 of the real-world data 304, the requested synthetic data 312 that at least partially mimics the real-world data 304 stored in the first memory (e.g., real-world system 302), wherein the data properties 164 associated with the synthetic data 312 at least partially match the data properties 164 associated with the real-world data 304. As described above with reference to FIG. 3, once the data properties 164 of the real-world data 304 have been determined (e.g., based on the sample data 172), the security manager 150 may be configured to generate synthetic data 312 that satisfies the data properties 164 of the real-world data 304. In other words, the security manager 150 generates synthetic data 312 whose data properties 164 at least partially match with the data properties of the real-world data

304, which causes the synthetic data 312 to at least partially mimic the real-world data 304.

In one or more embodiments, the security manager may be configured to use an ML algorithm 178*b* (e.g., a generative AI algorithm) to generate the synthetic data 312. In this context, the ML algorithm 178*b* may be trained to generate synthetic data 312 based on data properties 164 associated with the real-world data 304. The security manager 150 may be configured to input into the ML algorithm 178*b*, the data properties 164 of the real-world data 304. The security manager 150 may obtain the synthetic data as an output of the ML algorithm 178*b*.

At operation 510, the security manager 150 detects a request 360 (shown in FIG. 3) from an unauthorized user 106*a* (shown in FIG. 3) to access the real-world data 312 in the first memory (e.g., real-world system 302).

At operation 512, in response to detecting the request 360 to access the real-world data 304, the security manager 150 provides the unauthorized user 106*a* access to the synthetic data 312 that mimics the real-world data 304.

As described above with reference to FIG. 3, the security manager 150 may be configured to divert unauthorized accesses of the real-world data 304 to the synthetic data 312 to avoid a bad actor from gaining access to the real-world data 304 that may include sensitive information. For example, an unauthorized user 106*b* (e.g., a hacker) may use a user device 104*b* to place an unauthorized request 360 to access the real-world data 304. In response to detecting that the unauthorized user 106*b* is attempting to access the real-world data 304 (e.g., in response to detecting the unauthorized request 360), the security manager 150 may be configured to provide the unauthorized user 106*b* access to the synthetic data 312 that mimics the real-world data 304, instead of providing access to the real-world data 304. This essentially may distract and/or mislead the unauthorized user 106*b* and may avoid theft of the real-world data 304 or a portion thereof.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:

a memory configured to store data properties of real-world data; and a processor communicatively coupled to the memory and configured to:

receive a request to generate synthetic data based on real-world data stored in a first memory, wherein the synthetic data at least partially mimics the real-world data;

in response to receiving the request, access the first memory to extract at least a portion of the real-world data, wherein the extracted portion of the real-world data is to be used as sample data for generating the synthetic data;

determine data properties of the real-world data based on the sample data extracted from the first memory;

generate, based on the data properties of the real-world data, the requested synthetic data that at least partially mimics the real-world data stored in the first memory, wherein the data properties associated with the synthetic data at least partially match the data properties associated with the real-world data;

detect a request from an unauthorized user to access the real-world data in the first memory; and in response to detecting the request to access the real-world data, provide the unauthorized user access to the synthetic data that mimics the real-world data;

wherein the processor is configured to generate the synthetic data by:

obtaining a second piece of data, wherein the second piece of data comprises one or more of a second piece of real-world data or a second piece of synthetic data;

inputting the real-world data and the second piece of data into a data tumbler, wherein the data tumbler is a software program configured to generate the synthetic data by mixing different pieces of data; and obtaining the synthetic data as an output of the data tumbler.

2. The system of claim 1, wherein the processor is further configured to:

store the synthetic data in a second memory that is different from the first memory; and in response to detecting the request to access the real-world data, provide the unauthorized user access to the synthetic data stored in the second memory.

3. The system of claim 1, wherein:

the real-world data is associated with a production system;

the generated synthetic data is configured to at least partially mimic the real-world data associated with the production system;

the request from the unauthorized user comprises a request to access the production system; and the processor is further configured to:

generate a sandbox environment using the synthetic data, wherein the sandbox environment is separate from and configured to mimic the production system; and in response to detecting the request to access the real-world data, provide the unauthorized user access to the sandbox environment.

4. The system of claim 1, wherein production system runs on a first data server and the sandbox environment runs on a second data server that is different form the first data server.

5. The system of claim 1, wherein the processor is further configured to generate the synthetic data by obfuscating at least a portion of the real-world data.

6. The system of claim 1, wherein the processor is configured to use a generative Artificial Intelligence (AI) algorithm to generate the synthetic data based at least in part upon the real-world data.

7. A method comprising:

receiving a request to generate synthetic data based on real-world data stored in a first memory, wherein the synthetic data at least partially mimics the real-world data;

in response to receiving the request, accessing the first memory to extract at least a portion of the real-world data, wherein the extracted portion of the real-world data is to be used as sample data for generating the synthetic data;

determining data properties of the real-world data based on the sample data extracted from the first memory;

generating, based on the data properties of the real-world data, the requested synthetic data that at least partially mimics the real-world data stored in the first memory, wherein the data properties associated with the synthetic data at least partially match the data properties associated with the real-world data;

detecting a request from an unauthorized user to access the real-world data in the first memory; and in response to detecting the request to access the real-world data, providing the unauthorized user access to the synthetic data that mimics the real-world data;

wherein the method further comprises generating the synthetic data by:

obtaining a second piece of data, wherein the second piece of data comprises one or more of a second piece of real-world data or a second piece of synthetic data;

inputting the real-world data and the second piece of data into a data tumbler, wherein the data tumbler is a software program configured to generate the synthetic data by mixing different pieces of data; and obtaining the synthetic data as an output of the data tumbler.

8. The method of claim 7, further comprising:

storing the synthetic data in a second memory that is different from the first memory; and in response to detecting the request to access the real-world data, providing the unauthorized user access to the synthetic data stored in the second memory.

9. The method of claim 7, wherein:

the real-world data is associated with a production system;

the generated synthetic data is configured to at least partially mimic the real-world data associated with the production system;

the request from the unauthorized user comprises a request to access the production system; and further comprising:

generating a sandbox environment using the synthetic data, wherein the sandbox environment is separate from and configured to mimic the production system; and in response to detecting the request to access the real-world data, providing the unauthorized user access to the sandbox environment.

10. The method of claim 7, wherein production system runs on a first data server and the sandbox environment runs on a second data server that is different form the first data server.

11. The method of claim 7, further comprising generating the synthetic data by obfuscating at least a portion of the real-world data.

12. The method of claim 7, further comprising using a generative Artificial Intelligence (AI) algorithm to generate the synthetic data based at least in part upon the real-world data.

13. A non-transitory computer-readable medium storing instructions that when executed by a processor cause the processor to:

receive a request to generate synthetic data based on real-world data stored in a first memory, wherein the synthetic data at least partially mimics the real-world data;

in response to receiving the request, access the first memory to extract at least a portion of the real-world data, wherein the extracted portion of the real-world data is to be used as sample data for generating the synthetic data;

determine data properties of the real-world data based on the sample data extracted from the first memory;

generate, based on the data properties of the real-world data, the requested synthetic data that at least partially mimics the real-world data stored in the first memory, wherein the data properties associated with the synthetic data at least partially match the data properties associated with the real-world data;

detect a request from an unauthorized user to access the real-world data in the first memory; and in response to detecting the request to access the real-world data, provide the unauthorized user access to the synthetic data that mimics the real-world data;

wherein generating the synthetic data comprises:

obtaining a second piece of data, wherein the second piece of data comprises one or more of a second piece of real-world data or a second piece of synthetic data;

inputting the real-world data and the second piece of data into a data tumbler, wherein the data tumbler is a software program configured to generate the synthetic data by mixing different pieces of data; and obtaining the synthetic data as an output of the data tumbler.

14. The non-transitory computer-readable medium of claim 13, wherein the instructions further cause the processor to:

store the synthetic data in a second memory that is different from the first memory; and in response to detecting the request to access the real-world data, provide the unauthorized user access to the synthetic data stored in the second memory.

15. The non-transitory computer-readable medium of claim 13, wherein:

the real-world data is associated with a production system;

the generated synthetic data is configured to at least partially mimic the real-world data associated with the production system;

the request from the unauthorized user comprises a request to access the production system; and wherein the instructions further cause the processor to:

generate a sandbox environment using the synthetic data, wherein the sandbox environment is separate from and configured to mimic the production system; and in response to detecting the request to access the real-world data, provide the unauthorized user access to the sandbox environment.

16. The non-transitory computer-readable medium of claim 13, wherein production system runs on a first data server and the sandbox environment runs on a second data server that is different form the first data server.

17. The non-transitory computer-readable medium of claim 13, generating the synthetic data comprises obfuscating at least a portion of the real-world data.

* * * * *